United States Patent
Quintos

(10) Patent No.: US 6,829,428 B1
(45) Date of Patent: Dec. 7, 2004

(54) METHOD FOR COMPACT DISC PRESENTATION OF VIDEO MOVIES

(76) Inventor: Elias R. Quintos, 103 Hidden Pond Cir., Smithtown, NY (US) 11787

( * ) Notice: Subject to any disclaimer, the term of this patent is extended or adjusted under 35 U.S.C. 154(b) by 0 days.

(21) Appl. No.: 09/472,831

(22) Filed: Dec. 28, 1999

(51) Int. Cl.[7] .................................................. H04N 5/91
(52) U.S. Cl. .............................. 386/69; 386/125; 386/70
(58) Field of Search .............................. 386/46, 55, 52, 386/68, 69, 70, 82, 105, 106, 117, 125; 345/716, 723, 786

(56) References Cited

U.S. PATENT DOCUMENTS

| | | | |
|---|---|---|---|
| 5,532,830 A | * | 7/1996 | Schuler ........................ 386/52 |
| 6,335,742 B1 | * | 1/2002 | Takemoto .................... 386/117 |
| 6,400,378 B1 | * | 6/2002 | Snook ......................... 345/716 |
| 6,538,665 B2 | * | 3/2003 | Crow et al. .................. 345/723 |
| 6,574,416 B1 | * | 6/2003 | Posa et al. ..................... 386/68 |

* cited by examiner

Primary Examiner—Thai Tran
Assistant Examiner—Christopher Onuaku
(74) Attorney, Agent, or Firm—Armstrong, Kratz, Quintos, Hanson & Brooks, LLP

(57) ABSTRACT

A method for converting video movie (e.g., family video movie or the like) clips for computer presentation in multimedia format using compact discs by presenting on a computer screen a starting frame of each of desired video clips. Each starting frame of each of the desired video clips is made into a thumbnail image or picture (e.g., a reduced size video picture of the start of a certain video clip) for viewing on a computer screen. A plurality of thumbnail images or pictures are then set in a presentable format; and background sound or music is created for each of the video clips, if desired. Upon presentation of a plurality of thumbnail images or pictures on the computer screen, a user is capable of selecting and clicking a desired thumbnail image or picture in order to play a video clip corresponding to a selected one of the plurality of thumbnail images or pictures.

8 Claims, 6 Drawing Sheets

METHOD FOR COMPACT DISC PRESENTATION OF VIDEO MOVIES

BACKGROUND OF THE INVENTION

1. Field of the Invention

This invention generally relates to a method for compact disc presentation of video movies. Such apparatus and method of this invention convert video movie (e.g., family video movie or the like) clips for computer presentation in multi-media format using compact discs. More particularly, a family video movie is captured and digitized into the hard drive of a computer. The video clips are edited; and a starting frame of each of the video clips is made into a thumbnail image or picture (e.g., a reduced size video picture of the start of a certain video clip) for viewing on a computer screen. A plurality of thumbnail images or pictures are then set in a presentable format. Background sound or music is created for each of the video clips, if desired. A unique program is then created to provide an interactive multimedia presentation of the thumbnail pictures, along with their corresponding video clips. The files are stored into recordable compact disc for easy use; and the disc is then labeled.

2. Description of the Relevant Art

The traditional manner for viewing movie clips, in a traditional multimedia presentation, with the use of a video tape player imposes time-consuming fast forward and rewind searches of a film segment of interest.

At present, there are numerous commercially available video capture cards and programs that capture video tape playback, and store the corresponding film in digital format with a personal computer. Likewise, there are numerous compact disc recorders available for storing information, including digitized video clips.

However, without an organized program to present the movie video clips, a user or viewer must painstakingly search for the individual video clips. To a user's dismay, this task is fairly complex, and time-consuming.

A need was therefore felt to significantly ease the process of showing desired movie video clips by showing such desired movie clips on a computer screen in a multimedia format and in a clickable format using a compact disc medium.

It is therefore an object of the present invention to provide a method for compact disc presentation of video movies on a computer screen in a multimedia format and in a clickable format.

It is another object of the present invention to provide a method for compact disc presentation of video movies in which a video movie is captured and digitized into a hard drive of a computer, and edited, wherein a starting frame of each desired video clip is made into a thumbnail picture and set in a presentable format.

It is another object of this invention to provide a method for compact disc presentation of video movies in which a user or viewer can choose which segment or segments of a video movie to play by clicking on a thumbnail image or picture of a first frame of a desired video clip segment on a computer screen, the desired video clip having a starting frame thereof in the form of the thumbnail image or picture.

It is yet another object of the present invention to provide a method for compact disc presentation of video movies in which background sound or music is created in each desired video clip.

It is still another object of the present invention to provide a method for compact disc presentation of video movies with a computer program for providing an interactive multimedia presentation.

SUMMARY OF THE INVENTION

The aforementioned and other objects of the present invention are accomplished by providing an apparatus and a method for converting video movie (e.g., family video movie or the like) clips for computer presentation in multi-media format using compact discs by presenting on a computer screen a starting frame of each of desired video clips. Each starting frame of each of the desired video clips is made into a thumbnail image or picture (e.g., a reduced size video picture of the start of a certain video clip) for viewing on a computer screen. A plurality of thumbnail images or pictures are then set in a presentable format; and background sound or music is created for each of the video clips, if desired. Upon presentation of a plurality of thumbnail images or pictures on the computer screen, a user is capable of selecting and clicking a desired thumbnail image or picture in order to play a video clip corresponding to a selected one of the plurality of thumbnail images or pictures.

These and other features of the invention will be understood upon reading of the following description along with the drawings.

DETAILED DESCRIPTION OF THE PREFERRED EMBODIMENTS

Figure 1:
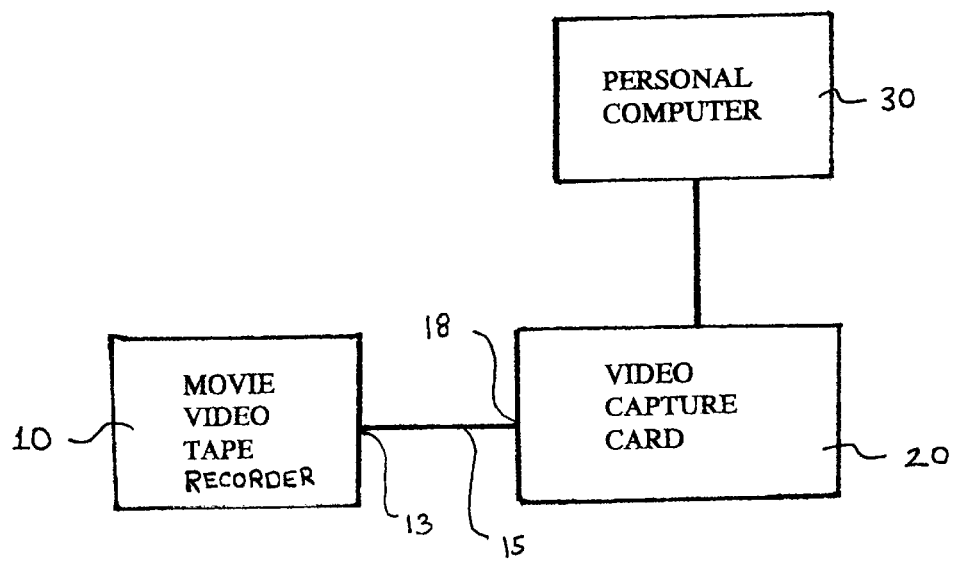
FIG. 1 is a schematic view of the apparatus and method for use in providing compact disc presentation of video movies with the creation in this invention of thumbnail images or pictures set in a presentable format on a computer screen.

FIG. 1 is a schematic view of the apparatus and method for use in providing compact disc presentation of video movies with the creation in this invention of thumbnail images or pictures set in a presentable format on a computer screen. Illustrated in FIG. 1 is a movie video tape recorder 10 coupled to a video capture card 20, which in turn is coupled to a personal computer 30. The video capture card 20 is preferably a Bravado video capture card with Adobe Premiere 4.2 software. The personal computer 30 is, for example, an IBM Pentium II 266 Mhz 48RAM personal computer. Standard RCA cables 15 are attached to the input jacks 18 of the video capture card 20 and the output jacks 13 of the video tape recorder 13.

Figure 2:
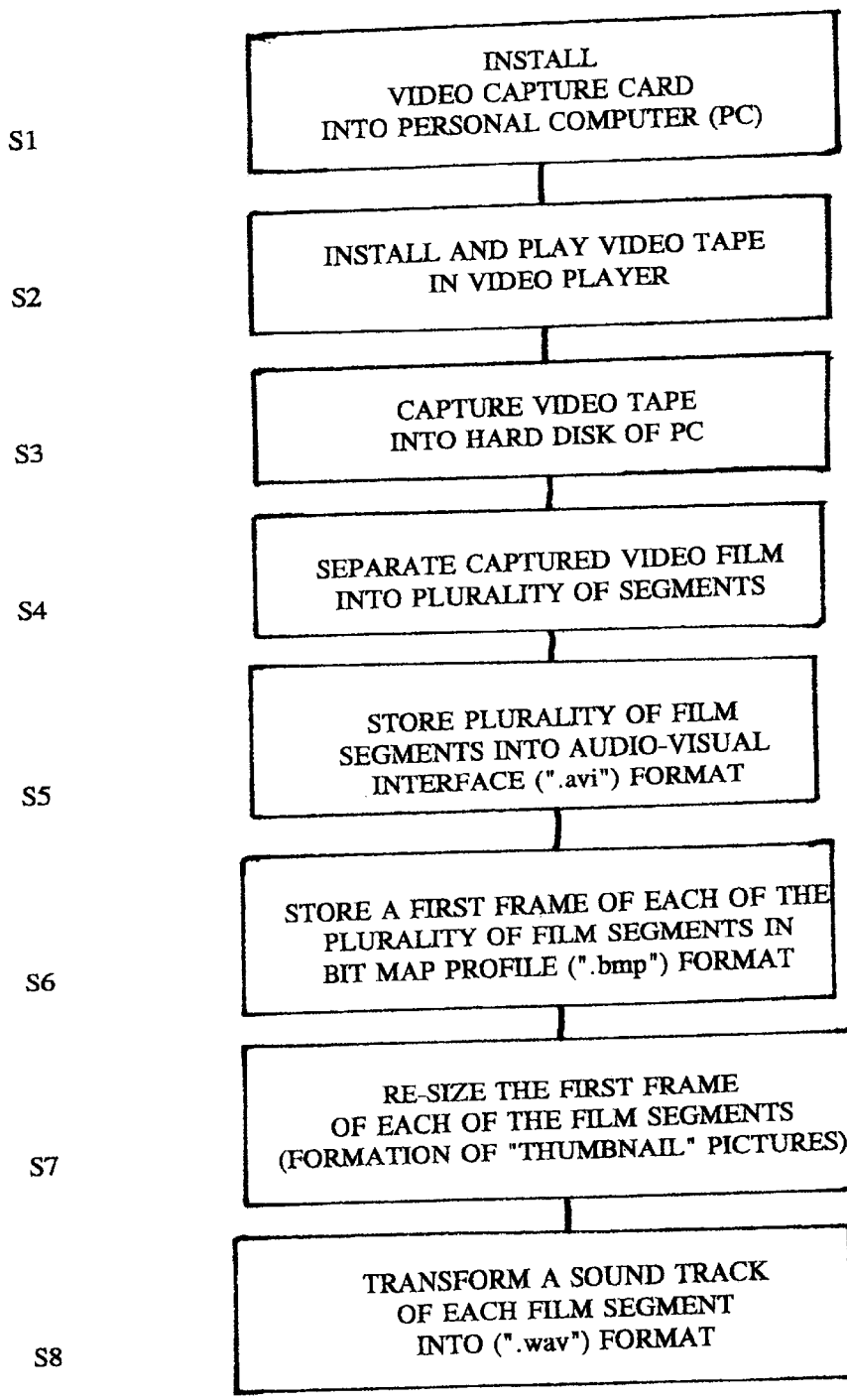
FIG. 2 is a flowchart of a method for creating the thumbnail images or pictures set in a presentable format for use in the disc presentation of the video movies of this invention.

As shown in FIG. 2, the video capture card 20 is installed into a PCI expansion slot in the personal computer 30 (S1). A video tape is then played in the video tape recorder 10 (S2) and captured into a hard disk of the personal computer 30 (S3). A captured video film is then separated into many segments by editing with Adobe Premiere software (S4). These are stored in ".avi" format (S5).

The first frame of each segment of video film clips is then stored as a ".bmp" format (S6) and re-sized with an image software or Paint Shop Pro software (S7). These will be the thumbnail images or pictures used to visually guide a user into selecting the corresponding video clip that is desired by the user.

The sound track of a segment of a video clip can be transformed into ".wav" format by the Adobe Premiere software (S8). The background sound or music is played as the thumbnail pictures are presented to the user.

Figure 3:
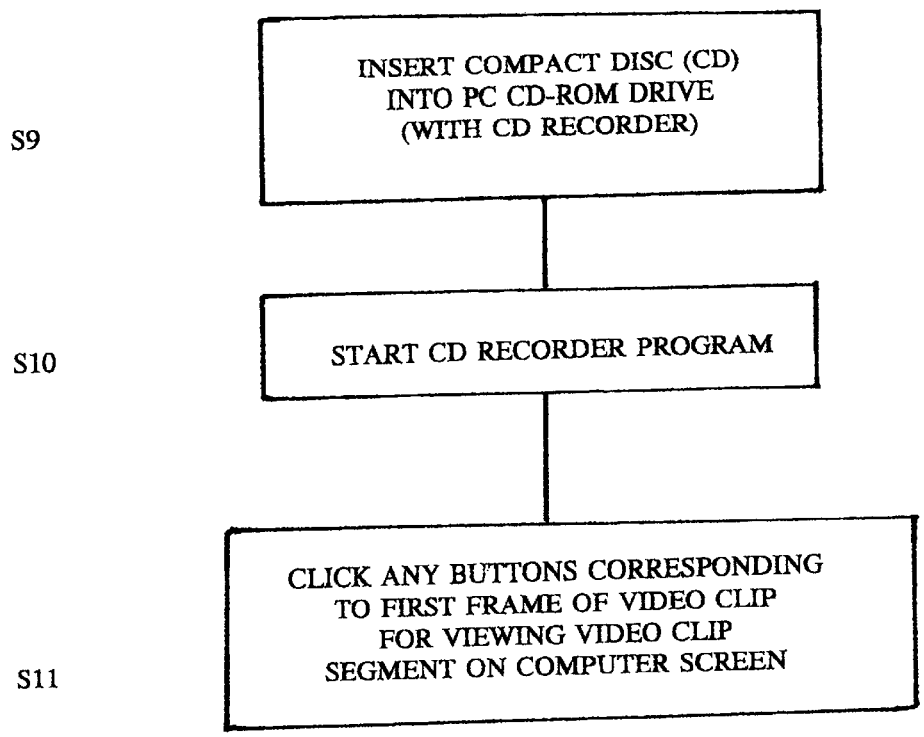
FIG. 3 is a flowchart of a method for providing the disc presentation of the video movies of this invention after the thumbnail images or pictures for use thereof have been created.

A program or application is then created using Microsoft Development Studio in Visual C++ to show the collated thumbnail images or pictures, as well as the corresponding video clips and background sound or music thereof. This program provides for presentation the multiple thumbnail images or pictures and video clips in an interactive format. FIG. 3 illustrates a general flowchart for showing the creation of such a program.

Figure 5:
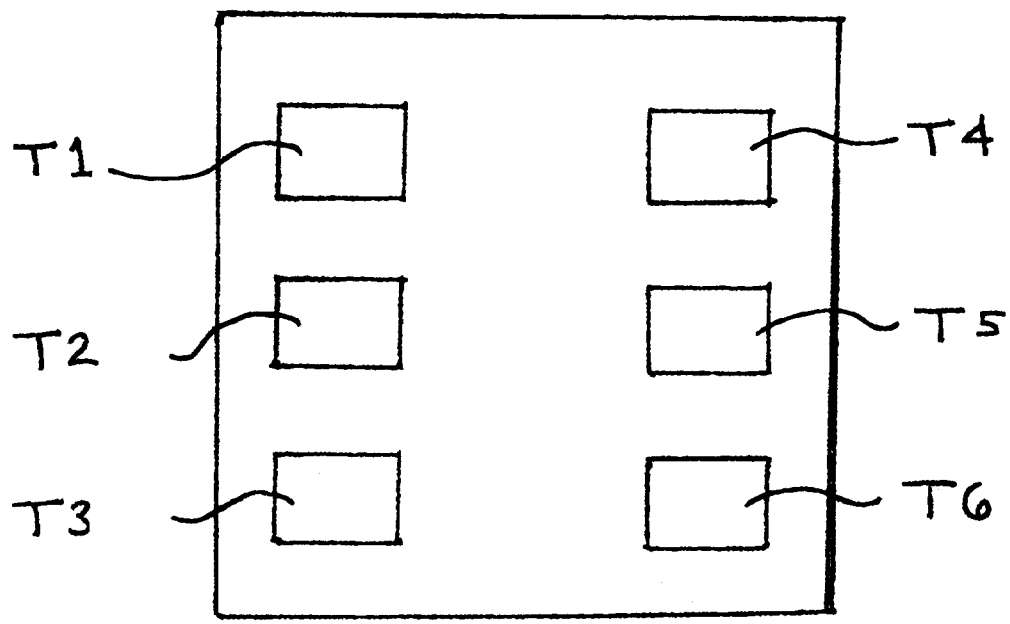
FIG. 5 is a schematic view of the thumbnail images or pictures set in a presentable format on a computer screen for use in the disc presentation of the video movies of this invention.

As illustrated in FIG. 3, a compact disc (CD) is inserted into a PC CD-ROM Drive (with CD recorder) (S9) so that the created program, along with the corresponding video clips, thumbnail images or pictures with background music or sound, and a "self-starting" command are recorded in the CD. It is preferred that a Philips Omniwriter CD recorder be used. The program, in the CD, automatically starts (S10); and the user merely clicks on any of the buttons relating to the thumbnail pictures or images T1–T6 (see, FIG. 5) corresponding to the first frame of a desired video clip to view that video clip segment on the computer screen (S11). The user may manually stop, rewind or replay any video clip, and has instantaneous access to any video clip at any time.

It is noted that the operating system needed to view the CD, having the above-discussed program therein, is Windows 95 or Windows 98. The computer system for use to view such CD is preferably a multimedia computer with a Pentium or similar processor, a CD-rom drive with video and sound capabilities.

The creation of the program installed in the CD in Step S10 is discussed hereinafter in reference to FIG. 4.

Figure 4:
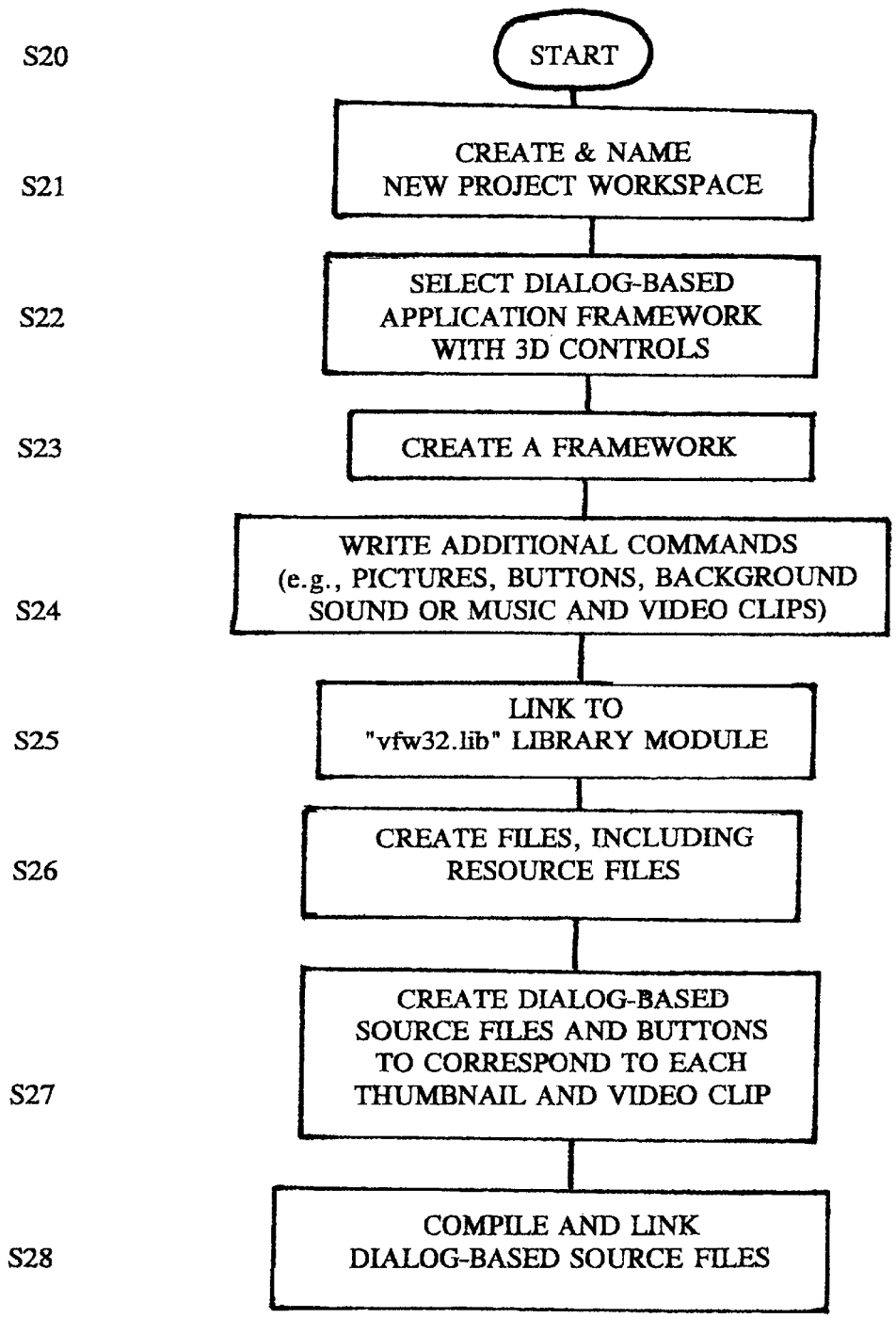
FIG. 4 is a flowchart illustrating more detailed method steps for Step S10, shown in FIG. 3.
Figure 4:
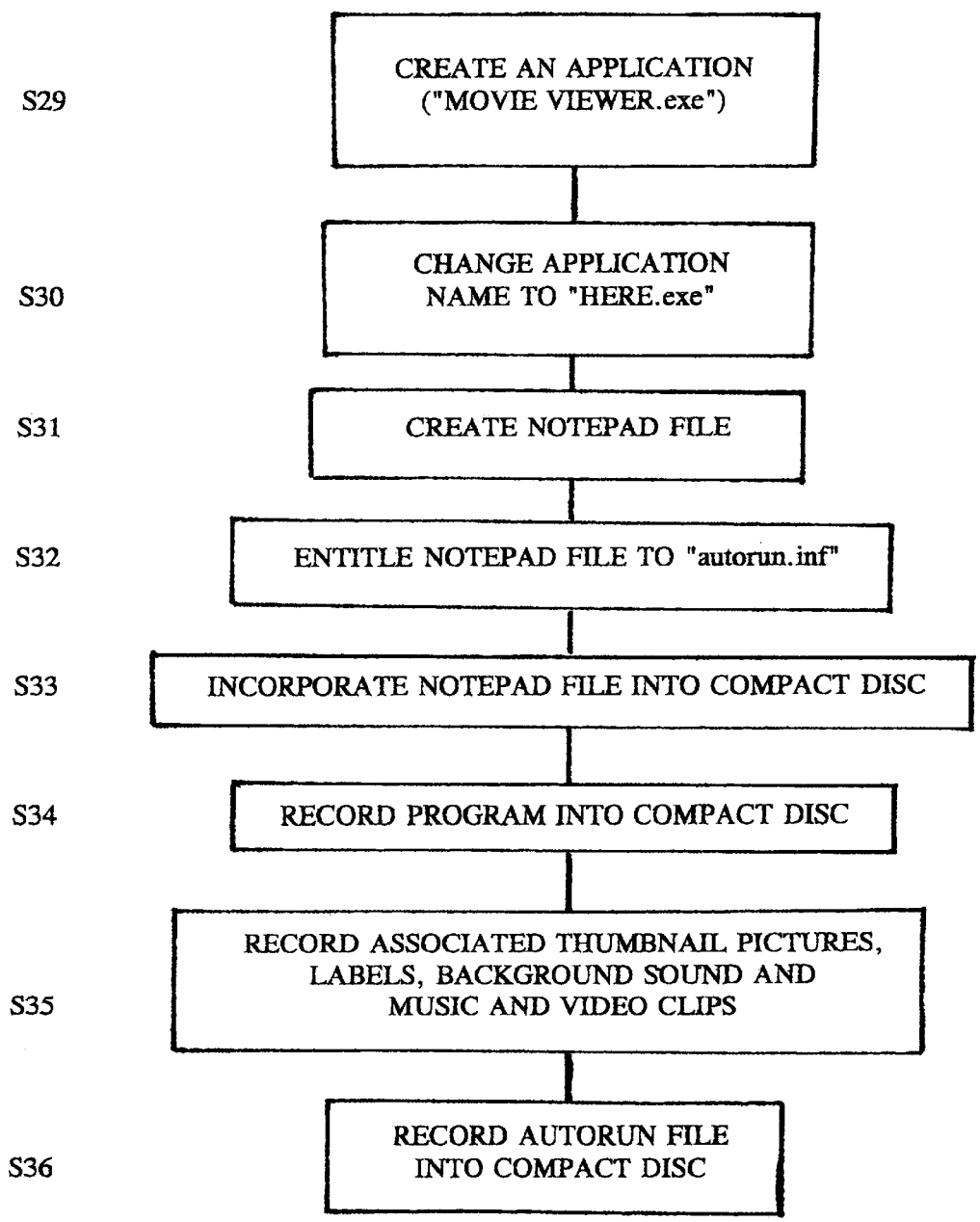

As shown in FIG. 4; the program creation starts by starting Microsoft Development Studio in, preferably, the same computer described above (S20). A new project workspace of Microsoft Foundation Class AppWizard type is named MOVIE VIEWER (or any preferred name) and created (S21). A dialog-based application framework is chosen with 3D controls (S22). A Microsoft Development Studio program then creates a framework (S23), where additional commands are written to incorporate the thumbnail images or pictures, buttons, background sound or music and video clips (S24). Three additional files are included into the project workspace; namely, "Dibapi.cpp", "Dibapi.h" and "Myfile.cpp". The first two files are part of a Microsoft Foundation Class Visual C++ library, while the last file is a source file for presenting Device Independent Bitmaps. The project is then linked to a "vfw32.lib" library module (S25). The Mircosoft Development Studio then creates the following files: "MOVIE VIEWERDlg.cpp", "MOVIE VIEWERDlg.h" and resource files (S26).

Hereinafter, the files created by Microsoft Development Studio are modified, as shown in the attached complete program. That is, dialog-based source files and buttons are created to correspond to each thumbnail picture or image and video clip (S27). After the source files are created, they are compiled and linked by Microsoft Development Studio (S28). Then, an application "MOVIE VIEWER.exe" is created and tested (S29). Once tested and working, the application name is changed. In this case, it is changed to "HERE.exe" (S30). A Notepad file is created (S31), and is entitled "autorun.inf" (S32). The contents of such notepad file are as follows: [autorun] and open=HERE.exe. Such notepad file is incorporated into the CD (S33) in order to allow the user's personal computer to automatically start the program "HERE.exe" once it is loaded into the CD-rom drive.

Once the program is successfully created, it is recorded permanently into a recordable CD, using, preferably, a Philips Omniwriter (S34). Associated thumbnail images or pictures, labels, background sound and music and video clips are recorded into the CD(S35); and the autorun file are likewise recorded into the CD (S36).

While the invention has been particularly shown and described in reference to preferred embodiments thereof, it will be understood by those skilled in the art that changes in form and details may be made therein without departing from the spirit and scope of the invention.

I claim:

1. A method for compact disc presentation of a video movie comprising the steps of:

providing a video movie for presentation;

selecting at least one thumbnail image or picture of a frame of said video movie from which to start the playing of said video movie; and presenting on a screen said at least one thumbnail image or picture of said video movie from which to start the playing of said video movie, wherein the step of providing the video movie for presentation includes the steps of:

installing video capture card into a personal computer, installing and playing video tape in a video player, capturing video tape into a hard disk of said personal computer, separating captured video film into a plurality of film segments, storing said plurality of film segments into an audio-visual interface format, storing a first frame of each of said plurality of film segments in bit map profile format, re-sizing said first frame of each of said plurality of film segments, transforming a sound track of each of said plurality of film segments into a format, inserting said compact disc into a CD-ROM drive of said personal computer, and starting a compact disc recorder program.

2. The method as in claim 1, wherein the step of starting said compact disc recording program includes the steps of:

creating and naming a new project workspace, selecting a dialog-based application framework with 3-D controls, creating a framework, writing additional commands, linking to a library module, creating files, creating dialog-based source files and buttons to correspond to said thumbnail image and said video clip segment, compiling and linking dialog-based source files, creating an application, changing application name, creating notepad file, entitling notepad file, incorporating notepad file into said compact disc, and recording said program into said compact disc.

3. The method as in claim 2, wherein the step of starting said compact disc recording program further includes the steps of:

recording at least associated thumbnail pictures, labels, background sound, and music and video clips, and recording autorun file into said /compact disc.

4. The method as in claim 2, wherein said step of linking to a library module includes the step of linking to a "vfw32.lib" library module.

5. The method as in claim 2, wherein said step of entitling notepad file includes the step of entitling said notepad file to "autorun.inf".

6. The method as in claim 1, wherein said step of storing said plurality of film segments into an audio-visual interface format includes the step of storing said plurality of film segment into an ".avi" audio-visual interface format.

7. The method as in claim 1, wherein said step of storing said first frame of each of said plurality of film segments in bit map profile format includes the step of storing said first frame in bit map ".bmp" format.

8. The method as in claim 1, wherein said step of transforming said sound track of each of said plurality of film segments into a ".wav" format.

* * * * *

UNITED STATES PATENT AND TRADEMARK OFFICE
CERTIFICATE OF CORRECTION

PATENT NO. : 6,829,428 B1
DATED : December 7, 2004
INVENTOR(S) : Quintos, Elias R.

It is certified that error appears in the above-identified patent and that said Letters Patent is hereby corrected as shown below:

Title page,
Item [76], Inventors, change "Elias R. Quintos, 103 Hidden Pond Cir., Smithtown, NY (US) 11787" to be -- Elias R. Quintos, 5 Pine Meadow Road, Vestal, NY (US) 13850 --

Signed and Sealed this

Twenty-second Day of March, 2005

JON W. DUDAS
*Director of the United States Patent and Trademark Office*